April 7, 1964  A. P. BEILER  3,128,054
AGRICULTURAL DEVICE

Filed March 12, 1962  3 Sheets-Sheet 3

INVENTOR.
AARON P. BEILER
BY *Walter V. Wright*

United States Patent Office 3,128,054
Patented Apr. 7, 1964

3,128,054
AGRICULTURAL DEVICE
Aaron P. Beiler, Gap, Pa., assignor to Sperry Rand Corporation, New Holland, Pa., a corporation of Delaware
Filed Mar. 12, 1962, Ser. No. 178,846
3 Claims. (Cl. 241—186)

This invention relates generally to hay processing equipment. More specifically, it relates to mechanism for shredding baled hay, or other material, from its baled condition to a loose, fluffy condition.

As is well known, hay is commonly formed into bales when it is harvested. Baling facilitates handling of the hay and requires much less storage space than would be required by the same amount of hay in its loose, natural form. While it is economical to handle and store hay in baled form, it is desirable, in virtually every instance, that the hay be in loose form for final use, or consumption. Consequently, a bale breaking operation is generally required between removal of the bales from storage and actual feeding of the hay to cattle. Many farmers and other hay uses tear the bales apart and scatter them manually. This is a time consuming, laborious operation.

A few mechanical devices for shredding bales are known. These devices generally consist of a driven, toothed cylinder against which bales are fed to be torn apart. The rate at which bales are fed to those cylinders is very important to their successful operation. If the bales are fed too slowly, time and power are wasted and the shredding operation is too costly. If the bales are fed too quickly, the device will be overloaded and jammed. Until recently, these feeding difficulties have not been much of a practical problem. The farmer merely attended the device and fed the bales at the proper rate by observing the shredding operation.

A current goal in the agricultural field is to completely automate animal feeding; thus, freeing the farmer of the time involved as well as the labor. While the presently known shredders save the farmer labor, they require full time manual attendance to control the feeding and are therefore unsatisfactory for use in a completely automated feeding system.

It is an object of this invention to provide an improved device to mechanically shred hay and other material from a baled condition to a loose fluffy condition.

It is another object of this invention to provide a bale shredding mechanism which is inexpensive, mechanically simple, and extremely rugged.

It is another object of this invention to provide a bale shredding mechanism which consumes relatively little power, while possessing a high bale shredding capacity.

It is another object of this invention to provide a bale shredding mechanism having control means to automatically prevent jamming or overloading of the shredding cylinder.

It is another object of this invention to provide a bale shredding mechanism having control means whereby the bale shredding cylinder automatically clears itself at the end of an operation, thereby insuring that the shredding cylinder not be started under load.

It is another object of this invention to provide a bale shredding mechanism which may be loaded with a number of bales after which the device may be operated for an extended period of time without requiring manual attendance.

It is another object of this invention to provide a device for shredding bales wherein the device may be operated for an extended period of time without manual attendance, thereby lending itself to remote, or automatic control.

Other objects and advantages of this invention will become apparent upon consideration of the following specification and drawings wherein.

Figure 2:
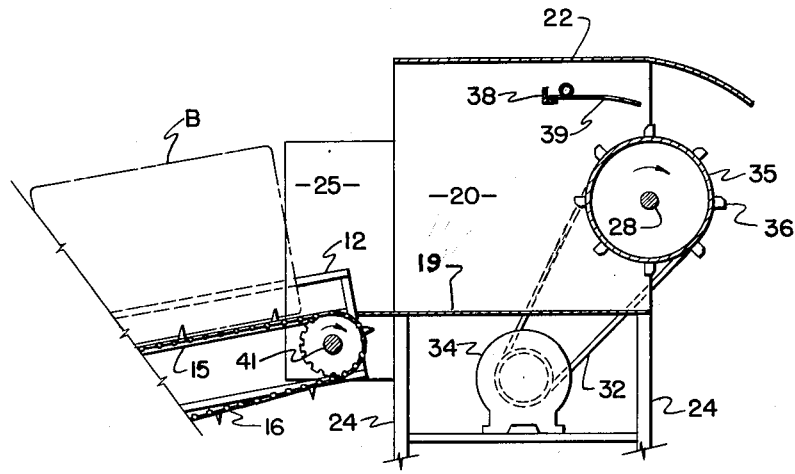
FIG. 2 is a longitudinal vertical sectional view taken on the line 2—2 of FIG. 1.

Referring now to the drawings in detail; the numeral 10 indicates, generally, an elongate bale conveyor having side guide rails 11 and 12 and longitudinally extending bale supporting rails 14 and 15. An endless chain 16 propels the bales along rails 14 and 15 from left to right as seen in FIG. 2.

Mechanism 18 for shredding bales is disposed at the delivery end of conveyor 10. This mechanism has a bottom plate 19, side walls 20 and 21, and a top 22 (FIG. 2) which constitutes a frame and housing supported on a plurality of legs 24. The shredding mechanism housing is open at both ends and provided with side guide plates 25 and 26 at the inlet end to direct bales being carried along conveyor 10 onto base plate 19. At the other end of shredding device 18, a horizontal transverse shaft 28 is mounted in bearings 29 and 30. A flywheel 31 fixed to one end of shaft 28 is driven by an endless belt 32 from a motor 34. A shredding cylinder 35, having teeth 36 projecting radially therefrom, is mounted on shaft 28 for rotation therewith. An angle iron support bar 38 has its ends mounted on side walls 20 and 21. Bar 38 extends between the sidewalls 20 and 21 at a height from bottom plate 19 which allows bales to pass underneath. A plurality of spring fingers 39 are mounted on bar 38 and extend longitudinally above shredding cylinder 35. The fingers 39 prevent any large wads of hay from being carried over the cylinder.

On the end of shaft 28 opposite flywheel 31, is mounted a pulley 40. Pulley 40 is an element of a speed reducing drive train extending from shredding cylinder shaft 28 to the drive shaft 41 of conveyor 10. Pulley 40 drives an endless belt 42 which in turn drives the input, or first, rotatable member 52 of a control device 44 which will be more fully described hereafter. The control device 44 drives an endless chain 45 which is entrained about a large diameter sprocket 46 mounted on a stub shaft 48, as may best be seen in FIG. 1. A small diameter sprocket 49 on stub shaft 48 drives another endless chain 50 which is entrained around a large diameter sprocket 51 on conveyor drive shaft 41.

Figure 4:
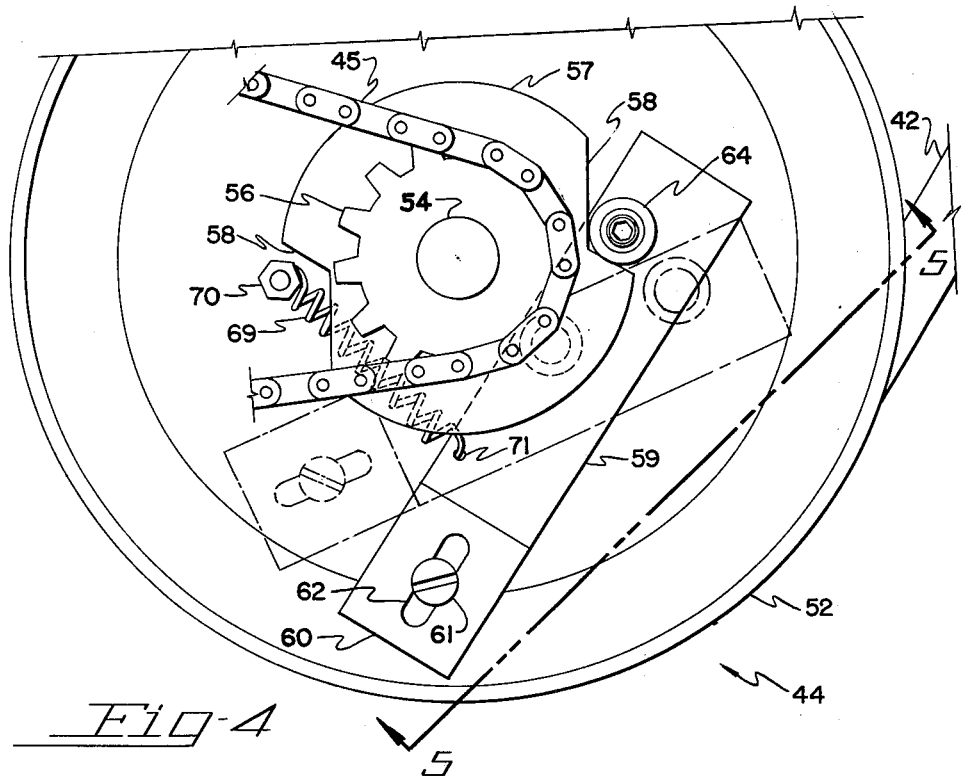
FIG. 4 is an enlarged fragmentary side elevational view of the control device taken on the line 4—4 of FIG. 1.
Figure 5:
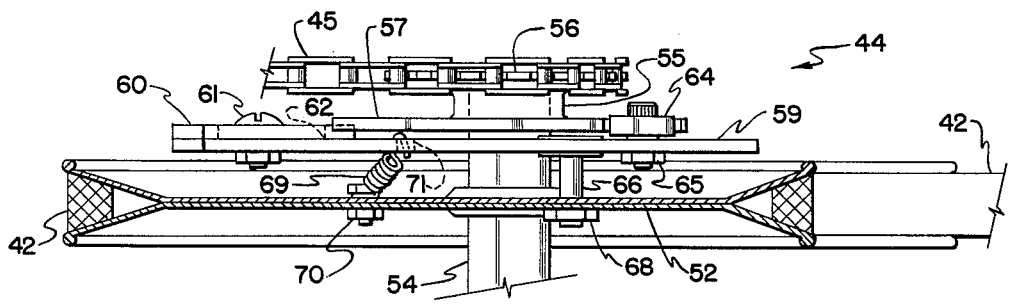
FIG. 5 is a sectional view through the control device taken on the line 5—5 of FIG. 4.

The control device 44 which controls driving engagement of the drive train from shaft 28 to conveyor drive shaft 41, will be better understood upon reference to FIGS. 4 and 5. It comprises a first member, or pulley, 52 mounted for rotation on stub shaft 54. In FIG. 5, the numeral 55 indicates the bearing portion of an integrally formed sprocket and ratchet, or second, member 55—56—57. Ratchet member 57 is provided with a pair of cutouts 58 (see FIG. 4). The integrally formed elements 55, 56 and 57 are freely rotatable on stub shaft 54. Disposed between ratchet member 57 and pulley 52 is a latch member, or arm 59. A weight 60 is attached to one end of arm 59 by a nut-bolt 61. A slot 62 through weight 60 enables the weight to be adjusted longitudinally of arm 59. At the end of arm 59 opposite weight 60 is mounted a roller 64. Roller 64 is attached to arm 59 by a bolt 65, as seen in FIG. 5. Roller 64 overlies ratchet member 57 as seen in FIG. 5. The arm 59 is pivotally carried on a pin 66 which is threaded at one end and mounted on pulley 52 by a nut 68. A coil spring 69 is also mounted on pulley 52 by a nut and bolt 70. The other end of spring 69 is hooked through a hole 71 in arm 59 and biases the arm toward the position shown in phantom in FIG. 4. In this position, pulley 52 will rotate about shaft 54 while sprocket 56, ratchet 57 and interconnecting portion 55 remain stationary. As the speed of rotation of pulley 52 increases, centrifugal force acting on weight 60, moves arm 59 toward the position shown in solid lines in FIG. 4. When this position is reached, roller 64 on arm 59 engages one of the cutouts 58 on ratchet member 57 and thereby drives output sprocket 56 of the control device. This effects driving engagement of the drive train between shredding cylinder shaft 28 and conveyor drive shaft 41.

Figure 1:
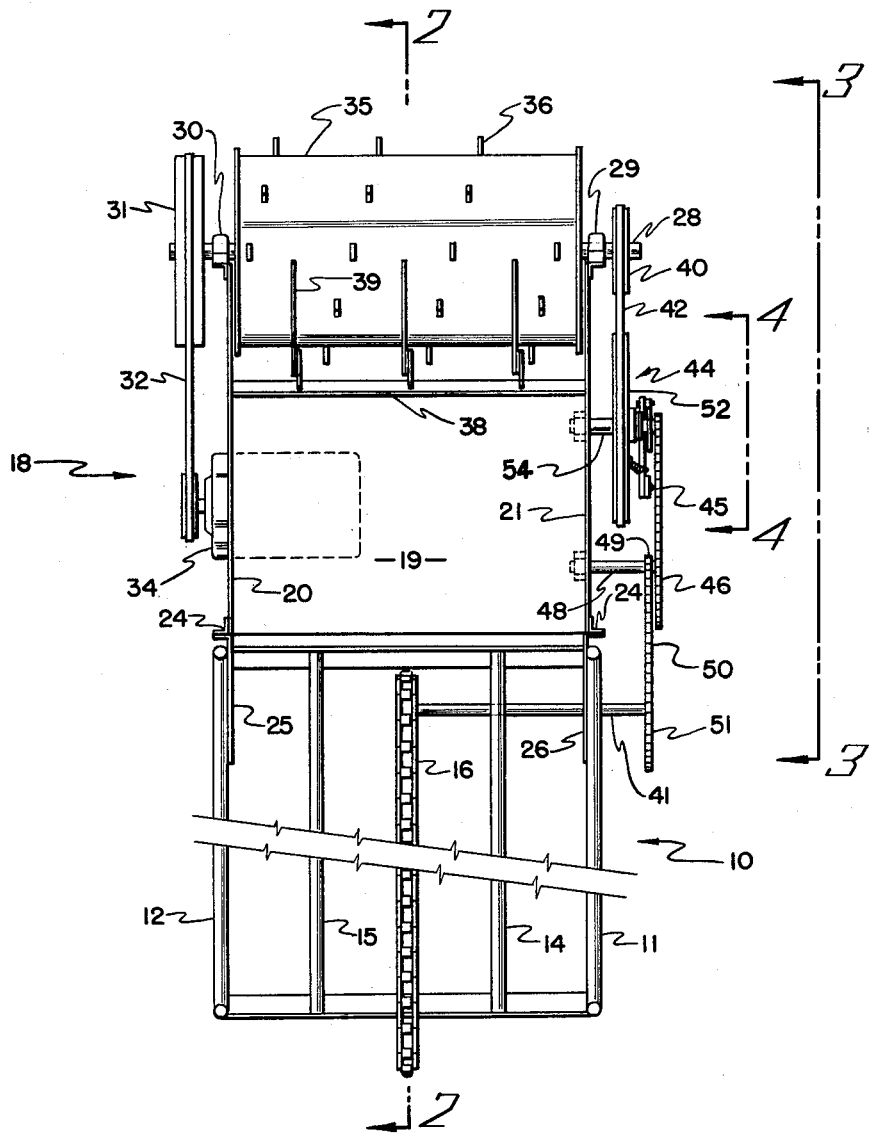
FIG. 1 is a fragmentary top plan view of a device embodying the principles of the present invention.
Figure 3:
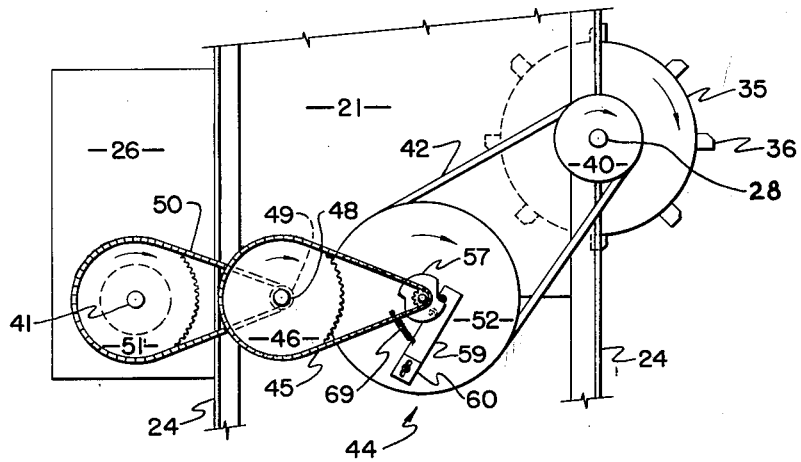
FIG. 3 is a fragmentary side elevational view taken on the line 3—3 of FIG. 1.

The general operation of the device of this invention will be readily understood upon consideration of FIGS. 1 and 2 of the drawings. The farmer initially loads conveyor 10 with a sufficient number of hay bales to met his hay feeding requirements for a given period of time. When current is applied to motor 34, shredding cylinder 35 is driven through flywheel 31 and belt 32. As cylinder 35 and its mounting shaft 28 rotate, the first rotatable member 52 of control device 44 is also rotated by belt 42 and the pulley, or drive wheel, 40 mounted on shaft 28. As shredding cylinder 35 and member 52 accelerate toward their proper operating speeds, centrifugal force on latch member 59 begins to move the latch in opposition to the biasing affect of spring 69. The latch member begins to move from its normal position (shown in phantom in FIG. 4) to the position shown in solid lines in FIG. 4. When the cylinder is rotating at proper operating speed, the roller 64 on latch member arm 59 will engage one of the cutouts 58 on ratchet member 57 of the control device. This will effect driving engagement of the speed reducing drive train extending from pulley 40 on shaft 28 to sprocket 51 on drive shaft 41 of the conveyor 10. When this driving engagement is effected, the conveyor 10 begins to feed bales slowly toward shredding cylinder 35 at precisely the correct rate of feed for the operating speed of the shredding cylinder. Only one bale B is shown diagrammatically on conveyor 10 in FIG. 2; however, other bales will follow immediately behind the illustrated bale and will therefore push the illustrated bale across bottom plate 19 to shredding cylinder 35. If the shredding cylinder should encounter a particularly dense portion in a bale and begin to slow down under the increased load, the control device 44 would quickly release the driving connection to infeed conveyor 10. This would release the load on shredding cylinder 35 until the cylinder again increases to proper operating speed. It will be apparent from the presence of flywheel 31 in FIG. 1, that shredding cylinder 35 will coast gradually to a stop when the driving current is shut off to motor 34. The control device 44, however, positively and quickly releases driving engagement of conveyor 10 as soon as cylinder 35 is slowed below normal operating speed. Thus, the infeeding of bales always stops before shredding cylinder 35 stops rotating. The shredding cylinder, therefore, always clears itself at the end of a shredding operation, even if the current should be shut off to motor 34 while a bale is in engagement with cylinder 35. This insures that there will be no load on the cylinder when it is again started until such time as it reaches its proper operating speed. The fact that the cylinder is never started under load, and that a flywheel is provided to increase the momentum of the cylinder, facilitates high shredding capacity while requiring only a relatively light motor 34. As can be seen best in FIG. 3, the speed at which conveyor 10 is driven is so geared down below that of the shredding cylinder 35 that relatively little power is consumed in operating the conveyor 10.

It will be seen from the above that once the farmer has loaded conveyor 10, the shredding device is ready for operation until such time as the last bale on conveyor 10 has moved therefrom onto bottom plate 19 of the shredder. No manual attendance of the device is required. It will be apparent from the above that this device readily lends itself to remote, or automatic, control; since the current controlling switch (not shown) for motor 34 may be located at any distant convenient location, or operated by a timer clock in a manner well known in the prior art and readily commercially available.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A device for shredding bales of hay or the like comprising an elongated conveyor adapted to receive a plurality of bales in end to end abutting relation and convey said bales to one end thereof, a frame at said one end of the conveyor, said frame having a planar horizontal bale supporting base member disposed to receive bales thereon and across which the bales travel as they are moved from said one end of said conveyor, a shaft journaled on said frame above said planar base member and extending across the path of travel of the bales across said base member, a toothed shredding cylinder mounted on said shaft in the path of travel of said bales across the base member, power means rotating said shaft and thereby rotating said cylinder in a direction whereby the teeth on said cylinder move upwardly into the forward end of a bale as it travels across said base member into engagement with said cylinder, a drive wheel mounted on said shaft for rotation therewith, a first stub shaft mounted on said frame and extending parallel to said cylinder shaft, a pair of rotatable members mounted on said shaft for rotation relative to each other, the first of said pair of members having a larger diameter than the second of said pair of members, an endless member entrained about said drive wheel and said first rotatable member and driving said first rotatable member from said drive wheel, a latch member mounted on said first rotatable member and movable into driving engagement with said second rotatable member in response to rotation of said first member above a predetermined speed, a second stub shaft mounted on said frame and extending parallel to said first stub shaft, a pair of rotatable members rigidly interconnected and mounted on said second stub shaft, one of the rotatable members on said second stub shaft having a larger diameter than the other rotatable member on said second stub shaft, an endless member entrained about the second rotatable member on said first stub shaft and said one of the rotatable members on said second stub shaft, an endless member entrained about said other rotatable member and drivingly engaging said conveyor thereby providing from said drive wheel to said conveyor a speed reducing drive train the driving engagement of which is responsive to the speed of said shredding cylinder.

2. A device for shredding bales of hay or the like comprising means to support a bale in a predetermined plane, an endless conveyor adapted to receive a plurality of bales thereon and move said bales successively across said support means, a toothed shredding cylinder disposed above said support means and in the path of movement of bales across said support means, power means rotating said toothed shredding cylinder in a direction whereby the teeth on said cylinder move upwardly into the end of a bale moving across said support means, a normally disengaged speed reducing drive train from said cylinder to said conveyor for driving the conveyor from the cylinder, and control means responsive to the speed of rotation of said cylinder to affect driving engagement of said drive train when said cylinder rotates above a predetermined speed.

3. A device for shredding bales of hay or the like comprising a frame having laterally spaced upstanding sides and a generally horizontal planar bottom, said frame having first and second open ends, an elongated bale supporting structure of sufficient length to receive a plurality of bales, one end of said supporting structure being connected to said frame on said first open end thereof and registering with said planar frame bottom, an endless conveyor carried by said supporting structure and operable to move bales successively from said support structure onto said planar frame bottom at said first open end thereof and across said bottom toward said second open end of the frame, a shaft journaled in said upstanding sides of said frame, said shaft being disposed in a plane parallel to said planar frame bottom and extending across the path of travel of said bales as they move over said bottom toward said second open end of the frame, a toothed shredding cylinder disposed between said frame sides and carried by said shaft for rotation therewith, power means rotating said shaft in a direction whereby the teeth on said shredding cylinder move upwardly into the end of a bale moving across said frame bottom toward said second opened end thereof, a normally disengaged speed reducing drive train connected to said shaft and to said endless conveyor for driving said conveyor from said shaft, and control means incorporated in said drive train to effect driving engagement of the drive train only in response to rotation of said shaft above a predetermined speed, said control means comprising a first rotatable member driven from said shaft, a second rotatable member drivingly connected to said conveyor, and a latch member carried by said first rotatable member and movable into driving engagement with said second rotatable member in response to the development of a predetermined centrifugal force on said latch member.

References Cited in the file of this patent
UNITED STATES PATENTS

| | | |
|---|---|---|
| 621,073 | Gregory | Mar. 14, 1899 |
| 627,613 | Goolman | June 27, 1899 |
| 715,443 | Vanhouweling | Dec. 2, 1902 |
| 719,856 | Payne | Feb. 3, 1903 |
| 1,256,120 | Fellows | Feb. 12, 1918 |
| 1,367,738 | Erickson | Feb. 8, 1921 |
| 1,626,608 | Hartley | May 3, 1927 |
| 2,749,696 | Innes | June 12, 1956 |

FOREIGN PATENTS

| | | |
|---|---|---|
| 606,827 | Germany | Dec. 11, 1934 |